Feb. 23, 1926.
G. JUER
1,573,837
BOBBIN WINDING MACHINE
Filed April 28, 1925   9 Sheets-Sheet 1
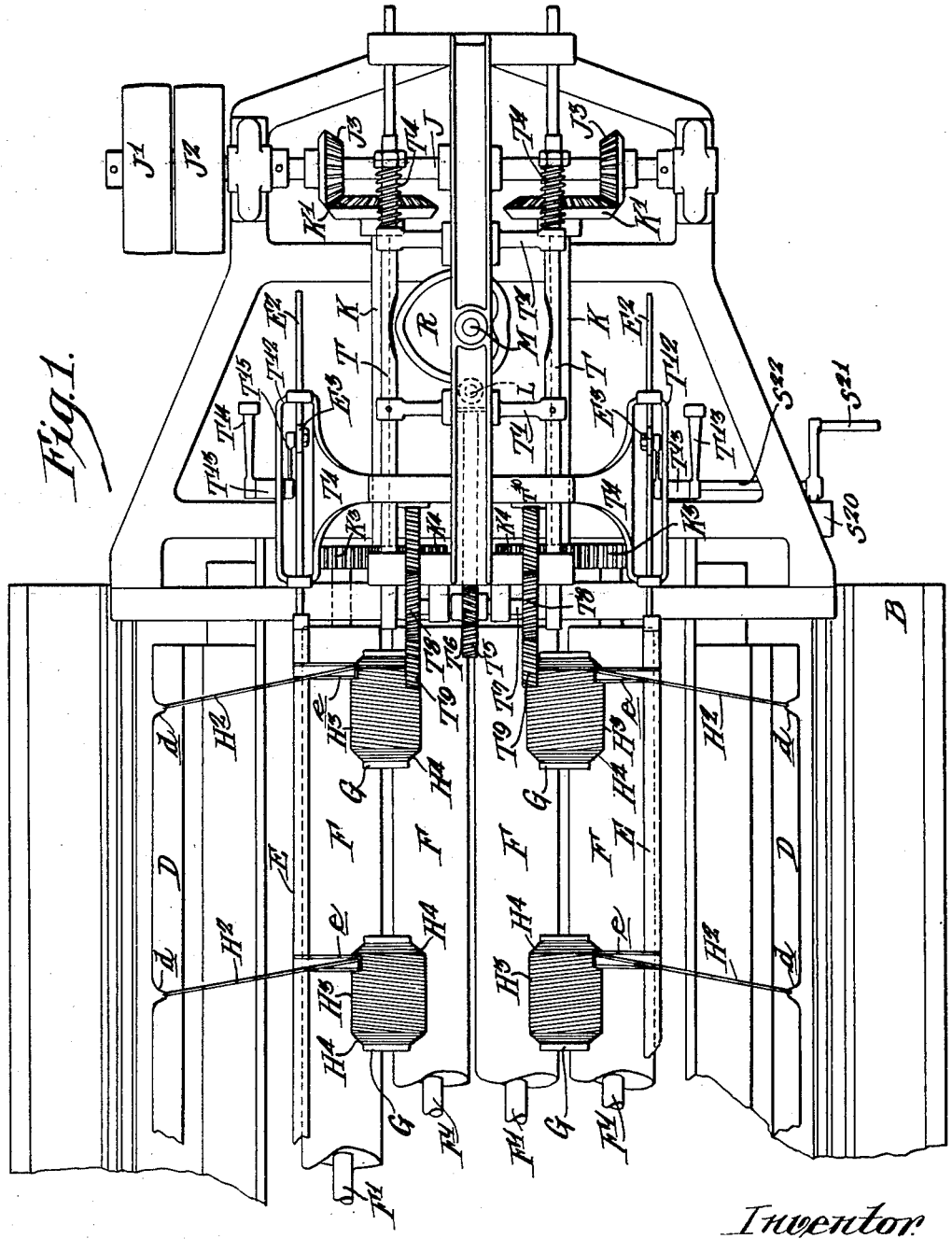
Inventor
George Juer
by Francis D Chambers
his Attorney.

Feb. 23, 1926.
G. JUER
1,573,837
BOBBIN WINDING MACHINE
Filed April 28, 1925    9 Sheets-Sheet 2
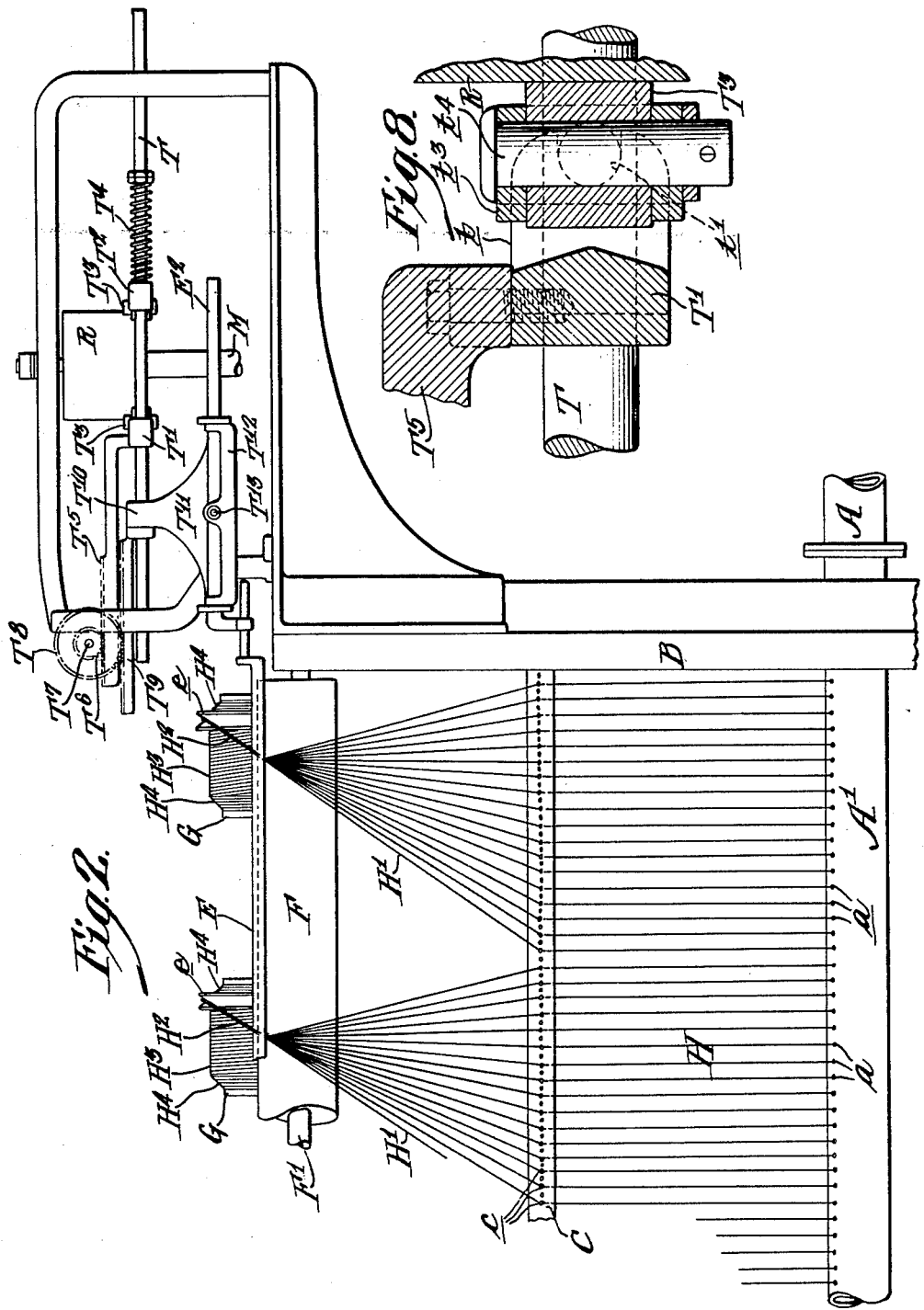

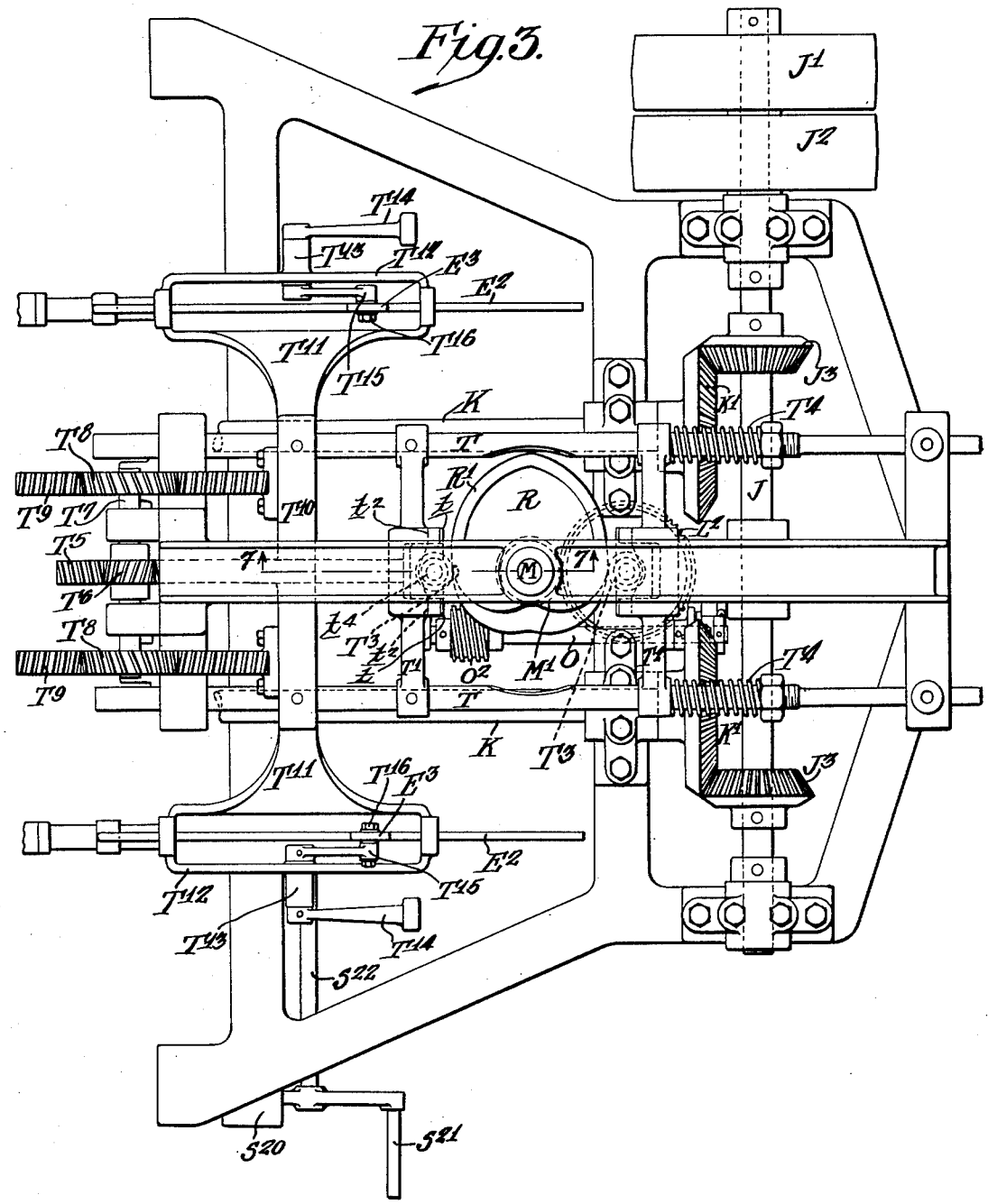

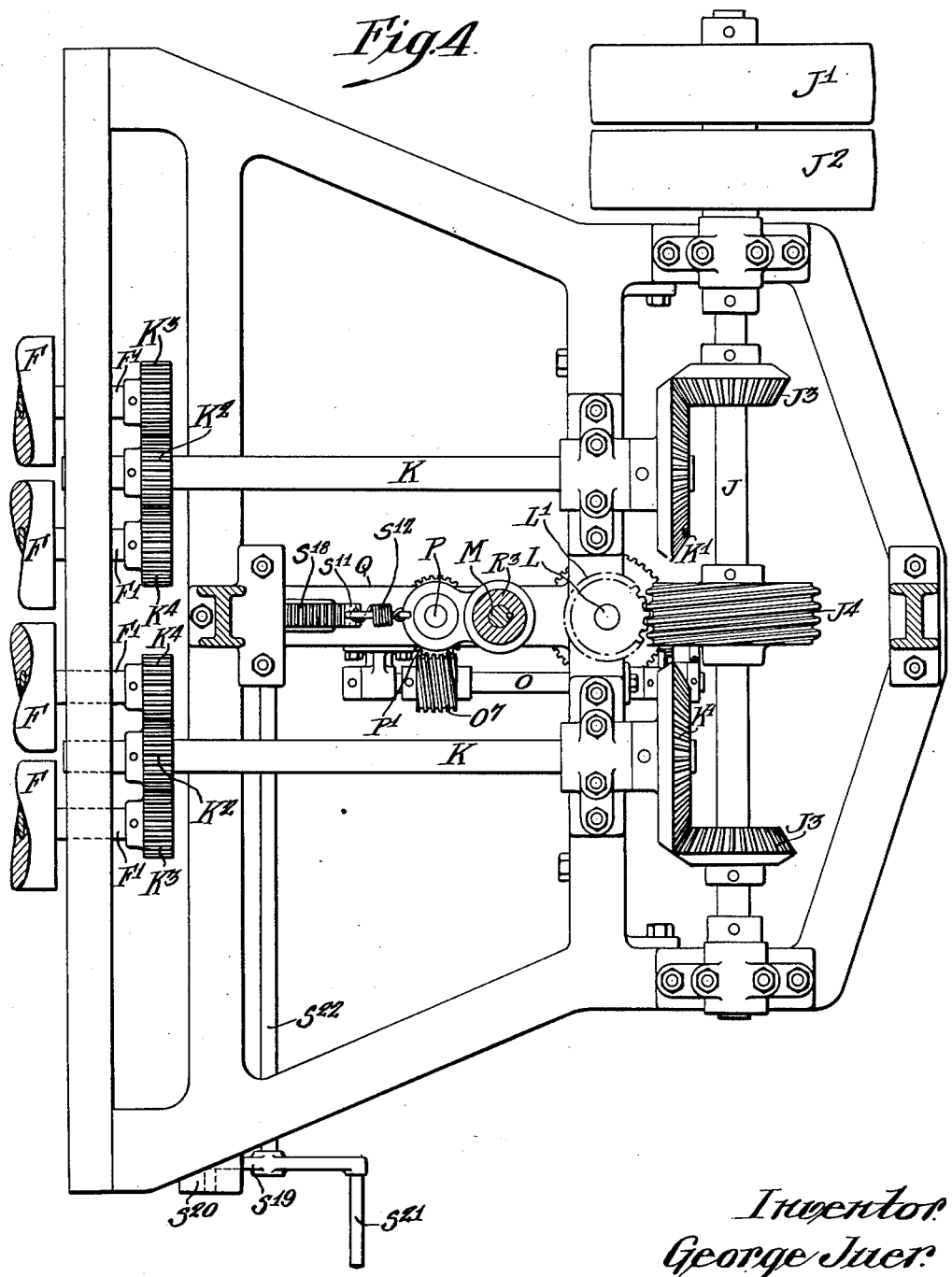

Feb. 23, 1926.
G. JUER
1,573,837
BOBBIN WINDING MACHINE
Filed April 28, 1925     9 Sheets-Sheet 5
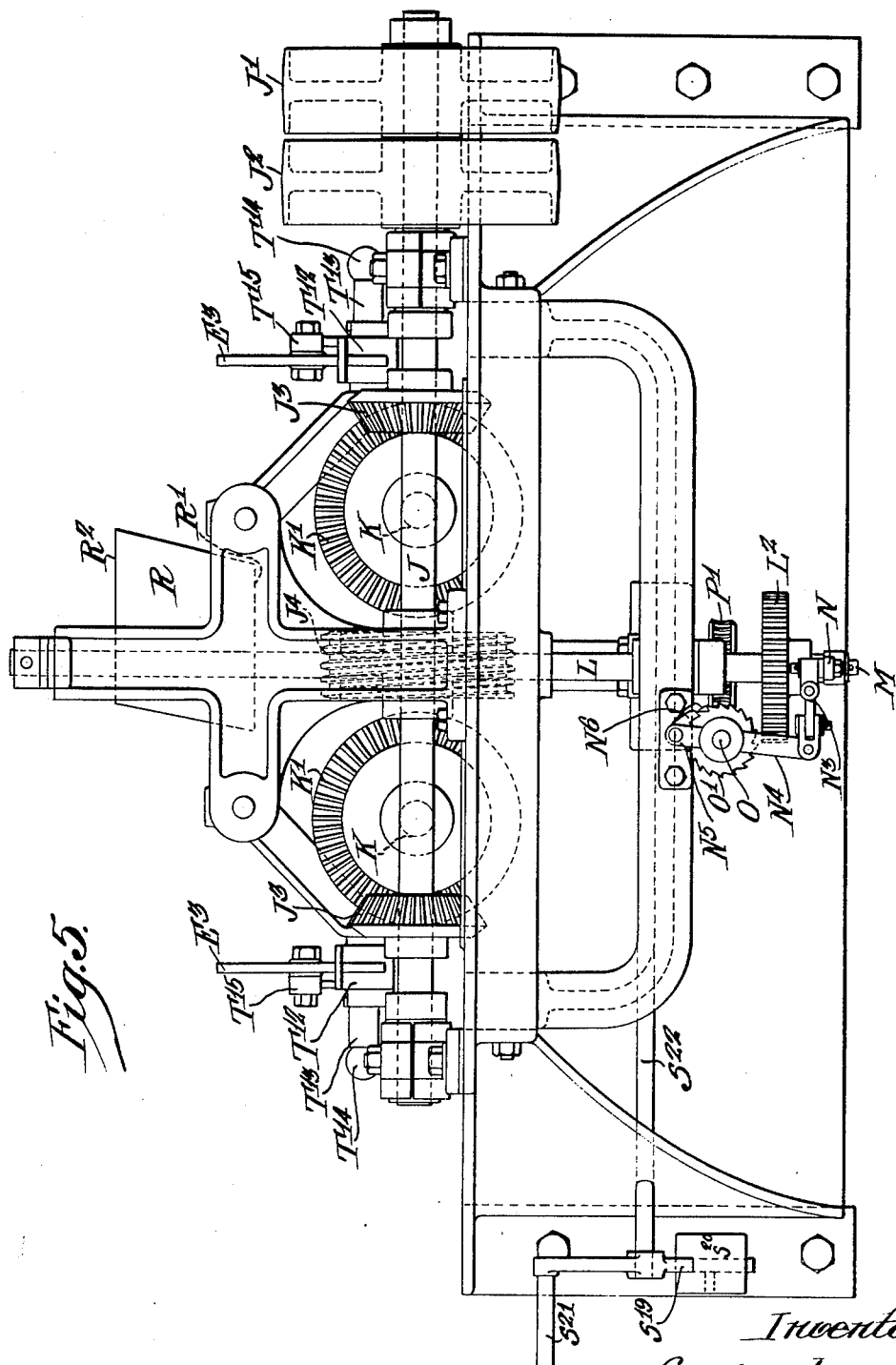
Inventor
George Juer.
by Francis S. Clement
his Attorney.

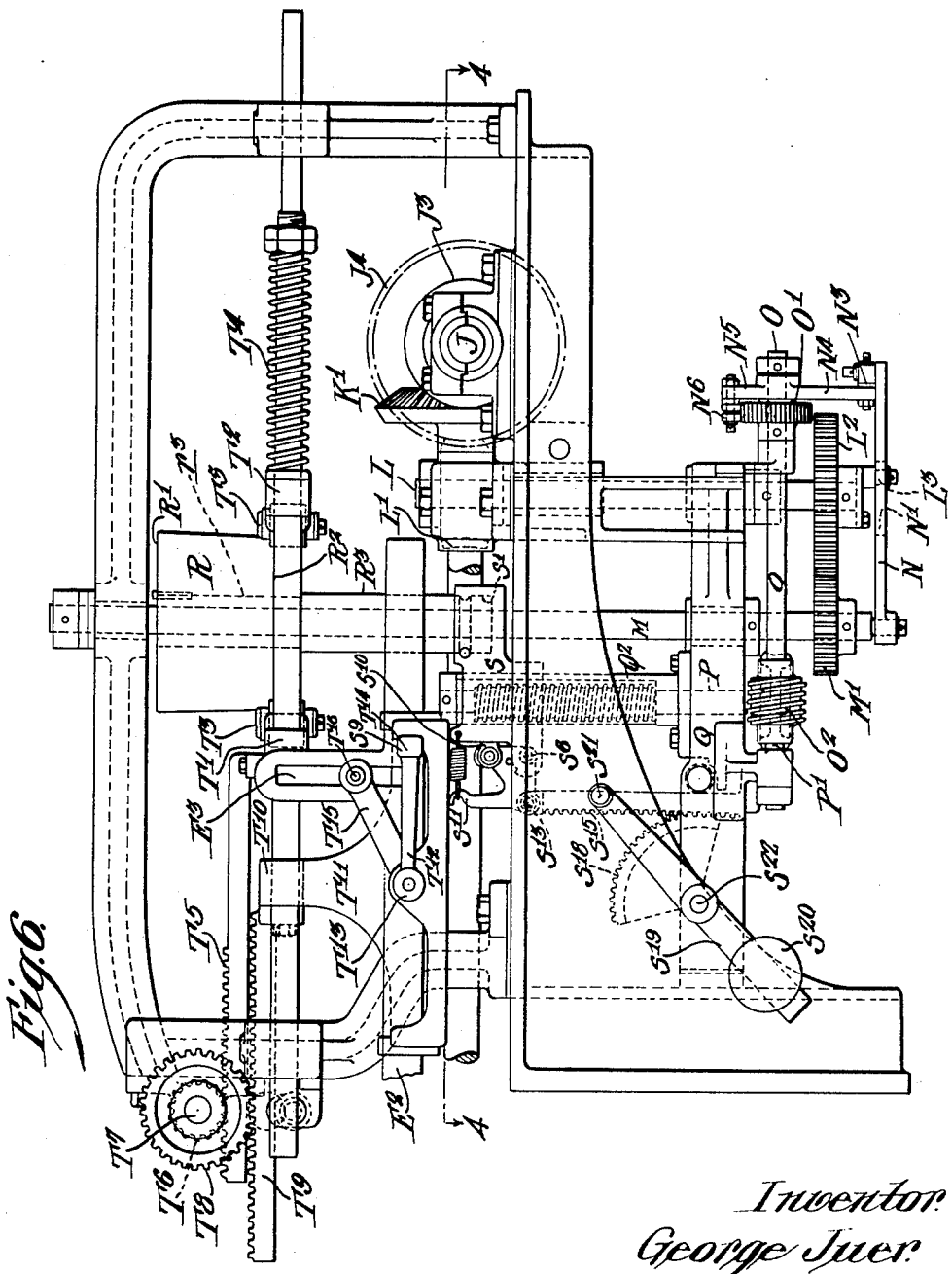

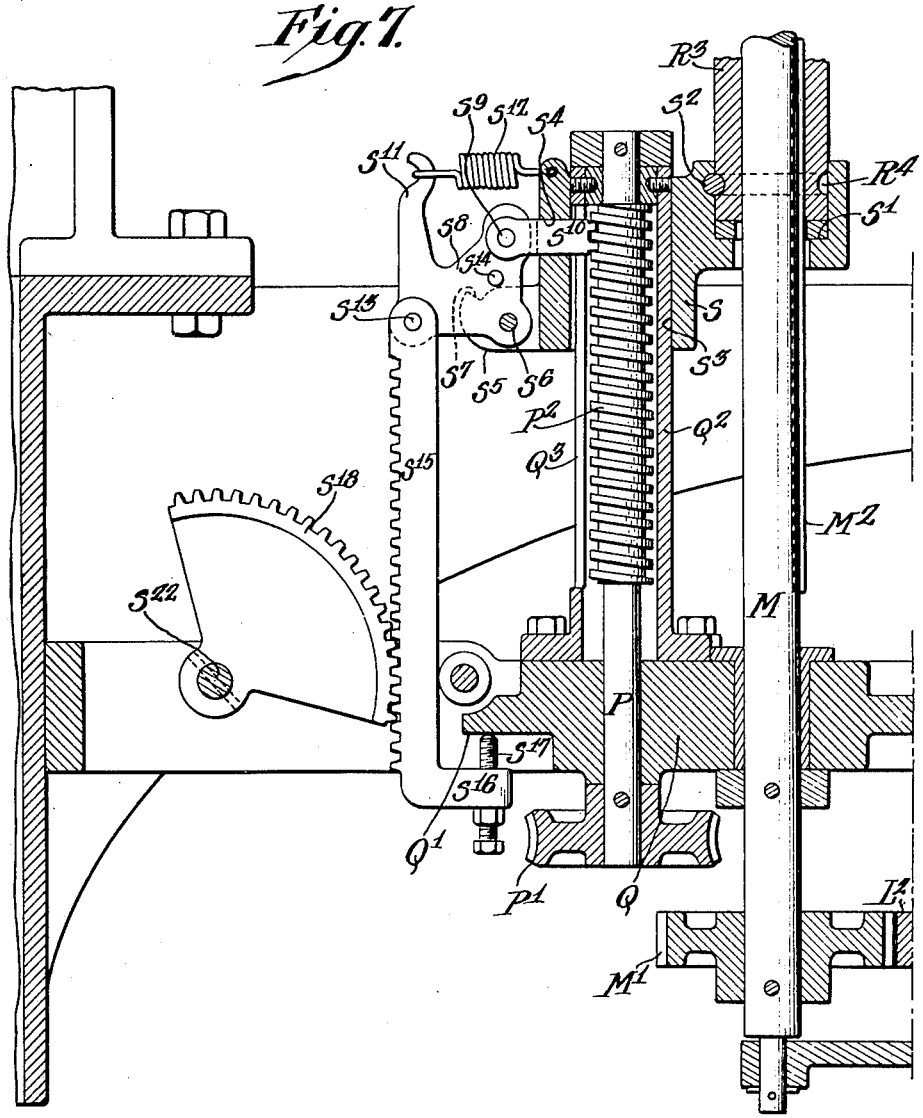

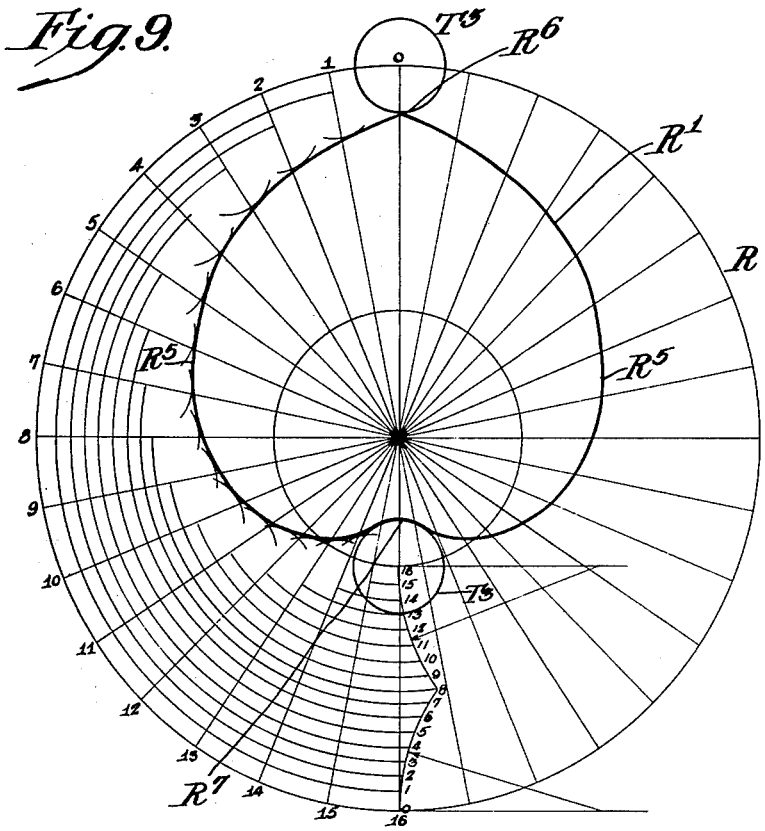
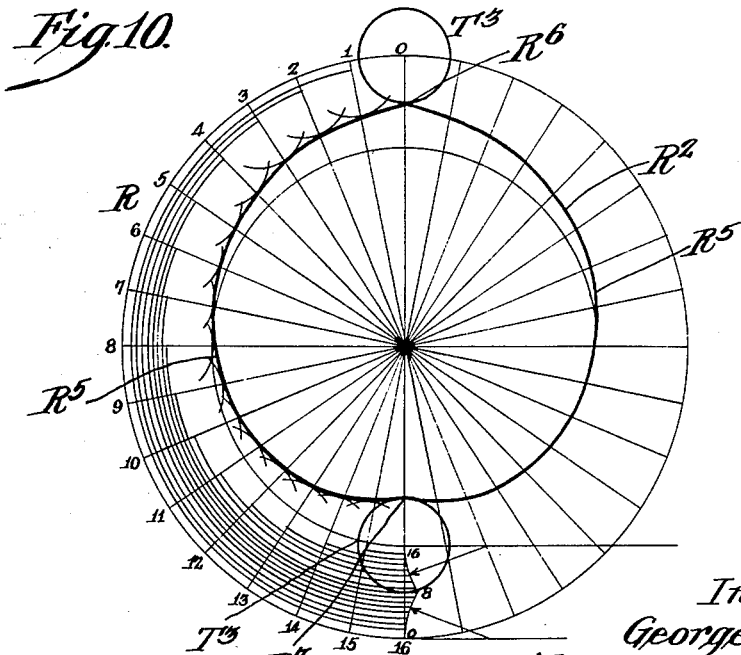

Feb. 23, 1926.
G. JUER
BOBBIN WINDING MACHINE
Filed April 28, 1925
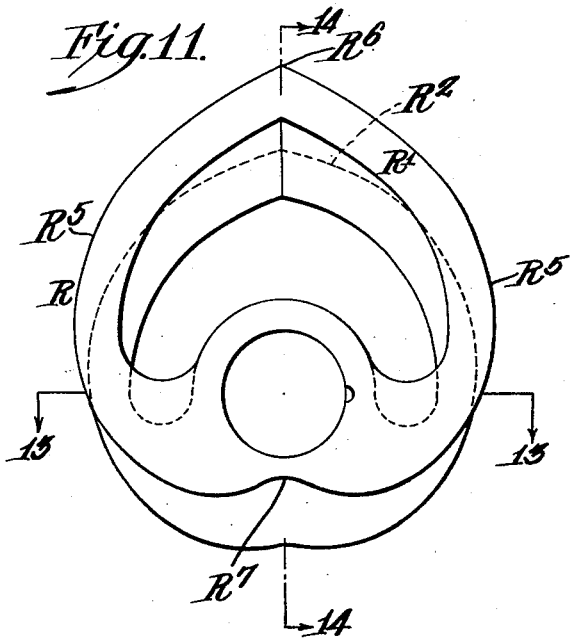
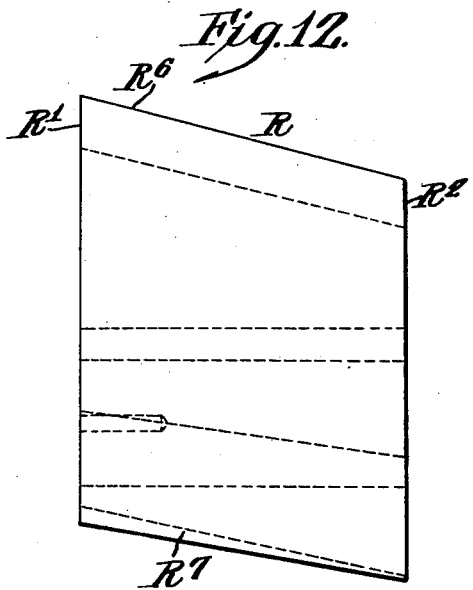
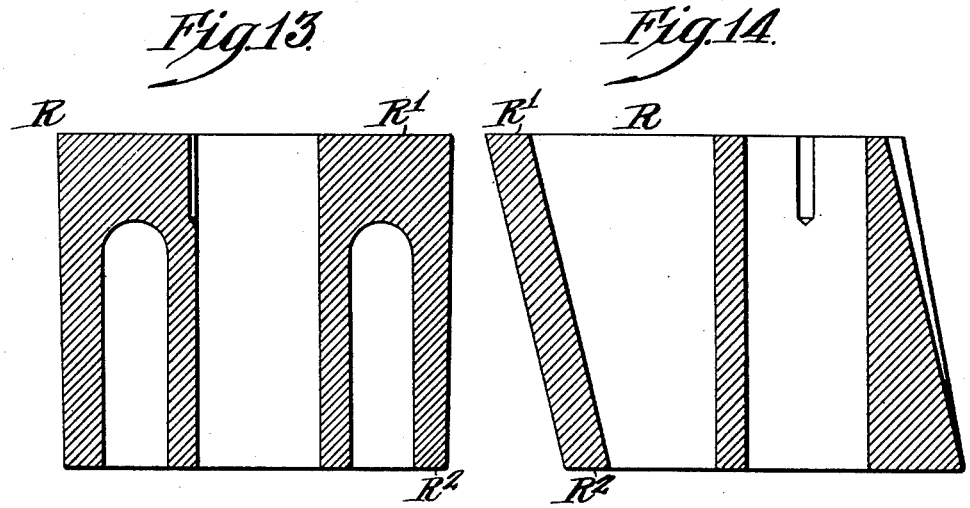
Inventor
George Juer Patented Feb. 23, 1926.

1,573,837

UNITED STATES PATENT OFFICE.

GEORGE JUER, OF HOPEWELL, VIRGINIA, ASSIGNOR TO TUBIZE ARTIFICIAL SILK COMPANY OF AMERICA, A CORPORATION OF DELAWARE.

BOBBIN-WINDING MACHINE.

Application filed April 28, 1925. Serial No. 26,346.

*To all whom it may concern:*

Be it known that I, GEORGE JUER, recently a subject of the former Austro-Hungarian Empire, and now a resident of Hopewell, county of Prince George, State of Virginia, have invented certain new and useful Improvements in Bobbin-Winding Machines, of which the following is a true and exact description, reference being had to the accompanying drawings, which form a part thereof.

My invention relates, generally speaking, to bobbin winding mechanism and especially to such mechanism used in combination with mechanism for exuding filaments of artificial silk which are wound on a bobbin as they come from the spinning mechanism. In such machines, as the filament is plastic as it leaves the orifice through which it is exuded, it is important that a constant tension should be maintained on the filament until it has set as otherwise it will increase or diminish in diameter and one object of my invention is to insure that the bobbin shall exert a constant pull on the filaments as they are wound upon it. Another object of my invention is to so feed the filaments or yarn to the bobbins that they will be wound thereon in compact spirally laid layers of progressively less length so that each layer forms a compact cylindrical surface on which the succeeding layer is wound and the danger of the outer coils slipping over the edges of the lower coils is avoided and, as a result of this mode of winding I am enabled to wind considerably more yarn on a bobbin.

The main feature of my invention lies in my employment as a means of actuating a reciprocating yarn carrier by means of which the yarn is delivered to the bobbin, to which a constant peripheral speed is imparted, of a drum cam of variable throw and of a progressively changing form by shifting which cam the desired shifting movements are imparted to the yarn carrier.

My invention in its detail will be best understood as described in connection with the drawings which illustrate a machine provided with my improvements and in which Figure 1 is a plan view of my machine.

Figure 2, a side elevation of a portion of the mechanism shown in Fig. 1.

Figure 3 is a plan view on a larger scale of a portion of the mechanism shown in Fig. 1.

Figure 4 is a plan on line 4—4 of Fig. 6

Figure 5 is an end elevation.

Figure 6, a side elevation of the mechanism shown in Fig. 3.

Figure 7 is a sectional elevation of the cam actuating and adjusting mechanism taken as on line 7—7 of Fig. 3.

Figure 8 is a sectional view on line 7—7 of Fig. 3, of a detail.

Figure 9 shows the outline of a drum cam at its top.

Figure 10 shows the outline of the drum cam at its bottom.

Figure 11 is a plan view of the drum cam.

Figure 12, a side elevation.

Figure 13, a section on the line 13—13 of Fig. 11, and

Figure 14, a section on the line 14—14 of Fig. 11.

A is a pipe through which collodion is forced under pressure into a header diagrammatically indicated at A' from which it issues as plastic filaments through fine orifices indicated at $a$. B is the frame of the machine. C, a guide bar having guide orifices $c$. D is a slotted guide having slots $d$ in which groups of filaments are gathered into yarns. E is a reciprocating bar to which yarn guides $e$ are secured. $E^2$ is a bar to which bar E is attached. F, F, are pairs of supporting rolls on which the bobbins G are supported and which are secured to shafts F' having bearings in the frame of the machine. H are the filaments of artificial silk, groups of which, as H', Fig. 2, are drawn together into a yarn $H^2$ which is guided by guide $e$ onto the bobbin G, the wound yarn being indicated at $H^3$, $H^4$.

Referring now to the mechanism for driving the bobbin supporting rolls and actuating the yarn guides, J is a shaft having fast and loose pulleys J' and J² and having also secured to it the miter wheels J³ and J³ which drive the parallel shafts K, K, through the miter wheels K'. To these shafts K are secured the gear wheels K² which in turn engage and drive the gears K³ and K⁴ secured one to each of the shafts F' of a pair of bobbin supporting rolls F, F. Also secured to the shaft J is the winder J⁴ which engages and drives a worm wheel L' secured at the top of the shaft L, to the lower end of which shaft is secured the gear wheel L² and a crank pin indicated at L³, see Fig. 6. The gear L² engages and drives the gear M' secured to the lower end of a shaft M, to which shaft is secured a key, as shown at M² in Fig. 7.

N is a lever pivoted on an extension of the shaft M and formed with a slot indicated at N' in which drops the crank pin L³. N³ is a connection through the end of the lever N to a pawl supporting lever N⁴, pivoted on a shaft O and having a pawl N⁶ supported on its arm N⁵. This pawl works upon a ratchet wheel O' secured to the shaft O, to which shaft is also secured a worm O², see Figs. 5 and 6, engaged with a worm wheel P' secured to the lower end of a shaft P on which is formed a screw thread as indicated at P². The screw shaft P has a bearing in the frame section Q which is formed with a projecting ledge Q' and the screw shaft passes upward through a sleeve bearing Q² formed with a longitudinal slot, as indicated Q³. R is a drum cam of variable throw which is keyed to the shaft M but free to slide longitudinally on the shaft and supported on an extension R³ formed at its upper end with a peripheral groove R⁴ and supported by a slide member S into a chamber S' into which the end of the member R³ extends and in which chamber it is secured, as shown, by a pin S². A cylindrical passage S³ of the slide fits on the tubular guide Q² and is formed with an opening S⁴, through which extends the retractable trigger S¹⁰, the end of which is shaped to form an end section engaging the screw on the shaft P. From the slide extend the arms indicated at S⁵ supporting a pivot pin S⁶ and formed with stop shoulders indicated at S⁷. S⁸ is a lever pivoted on the pin S⁶ and carrying a pivot pin S⁹ to which the trigger S¹⁰ is attached, the lever having also an arm S¹¹ which, by means of the spring S¹², is drawn so as to turn the lever in the direction to press the trigger against the screw shaft. S¹³ is another pivot pin carried by the lever S⁸. S¹⁴, a stop pin also carried by this lever and S¹⁵ is a rack secured on the pin S¹³ having at its lower end an angularly extending shoulder S¹⁶ extending below the ledge Q' and in which is adjustably secured an abutting screw indicated at S¹⁷. S¹⁸ is a segmental gear engaged with the rack S¹⁵ and supported by a shaft S²². Attached to this shaft is the handle lever S¹⁹ carrying a handle S²¹ and a counterbalancing weight indicated at S²⁰.

The conformation of the drum cam R will vary with the length of the bobbins to be wound and, to some extent, with other variations in the machine. The cam shown in detail in Figures 9 to 14, is, however, typical in its general conformation. At the top, indicated at R', the cam has its greatest throw. At the bottom, indicated at R², its lowest throw. Between the top and bottom of the cam it is so shaped as to gradually diminish the linear speed of motion given to the yarn carrier in approximate proportion to the increasing diameter of the wound bobbin so that the coils of yarn will, through all parts of the winding operation, be spaced upon the bobbin at approximately the same distance from the adjacent coils. Again, the conformation given to the sides of the cam indicated at R⁵ should, for the best results, be such that the linear speed of travel imparted to the yarn carrier will be progressively greater as the yarn carrier moves from a position in which it is delivering yarn to the center of the bobbin towards the ends of the bobbin, this being desirable so as to maintain an approximately constant tension on the yarn and on the filaments of which the yarn is composed.

T, T, are parallel slide bars moving in bearings on the frame of the machine and situated on each side of the cam R. These slide bars are connected by a cross bar T' from which extend arms $t$ supporting in bearings $t'$ trunnions $t²$ extending out from a frame $t³$ on which, by means of a pivot $t⁴$, is secured the cam contacting roller T³. On the other side of the cam R a cross bar T² is slidingly supported on the slides T, T, and pressed toward the cam by means of the spring T⁴. A cam contacting roller is supported on the cross bar T² in the same manner as is the roll and cross bar T' and as best shown in Fig. 8.

T⁵ is a rack bar secured to the cross bar T' and engaged by a gear wheel T⁶ secured at the center to a shaft T⁷, to the ends of which are secured gear wheels T⁸, T⁸, engaging rack bars T⁹, T⁹, which are attached to a bar T¹⁰, to the ends of which bar are secured the sliding supports indicated at T¹¹, T¹¹, which slidingly support the bars E², E², formed with slot extensions indicated at E³. T¹³ are bearings for shafts to one end of which shafts are secured handle levers T¹⁴ and to the other end the levers T¹⁵, carrying pins T¹⁶ which engage in the slots E³.

In operation the bobbin rolls F are rotated through the desired gears from the driving shaft J and the bobbins G are rotated by the drums F at constant peripheral speed. At the beginning of a bobbin winding operation, the cam R is set in its lowest position so that its upper portion which is that having the greatest throw, is in contact with the cam rolls. By means of the worm J⁴ and the worm wheel L' the shaft L is rotated and through the gear wheels L² and M' the shaft M is rotated which in turn through the key M² effects the rotation of the cam R. This cam acting on the cam rolls T³ gives a reciprocating movement to the slide bars T and to the connected rack T⁵ which, through the gears T⁶ an T⁸, reciprocates the rack bars T⁹ at an increased speed and to an increased distance and by means of these rack bars the cross bar T¹⁰ and its adjustments are reciprocated, the bars E² being attached to the bars E, giving a reciprocating movement to the yarn carrier e so that the yarn is fed to the bobbins G.

When it is desired to transfer the feed from a filled to an empty bobbin this can readily be effected without stopping the machine by turning the handles T¹⁴ and, through the levers T¹⁵ and their connected pins T¹⁶, shifting the bars E² and, of course, the bars E connected with them, to a position to bring the yarn carrier e into registry with another bobbin. As the shaft L rotates, the eccentric pin L³ at its lower end imparts a reciprocating movement to the lever N which is fitted on the lower end of the shaft M and which in turn reciprocates the pawl lever N⁴, N⁵ so that the pawl N⁶ imparts an intermittent rotating movement to the shaft O through its rotating wheel O'. Through the worm O² and the worm wheel P', an intermittent rotative movement is imparted to the screw shaft P and the screw being engaged in the trigger S¹⁰ the effect is to progressively shift the slide S and the cam supported upon it upward so that sections of the drum cam of progressively less throw act upon the slide at each successive rotation of the drum cam, thus diminishing the length of the path of the yarn carrier so that each layer of yarn delivered to the bobbin is wound on a shorter surface.

At the end of the upward movement of the drum cam, I provide means for automatically disconnecting the trigger S¹⁰ with the screw P². Thus, as shown in Fig. 7, the set screw S¹⁷ comes in contact with the projection Q' after which the upward motion of the rack S¹⁵ is arrested and as the slide S moves upward the lever S⁸ is turned on its pivot S⁶, withdrawing the trigger S¹⁰ from contact with the screw and arresting further upward movement of the cam.

To return the cam to position to begin the winding of the new bobbin the shaft S²² is rotated as by means of the crank S²¹ so that the segment S¹⁸ will draw down on the rack S¹⁵, retracting the trigger S¹⁰ if it has not been automatically disconnected from the screw as already described, and then drawing down slide S and the cam carried by it to the lowermost position, after reaching which the trigger is again permitted to move in under the action of its spring S¹² so as to engage the screw; the counterbalance indicated at S²⁰, together with the frictional resistance of the slide is such as to practically balance the weight of the slide S and the cam supported upon it.

It will be understood that while my invention is partly directed to the winding of artificial silk as its filaments are exuded from spinnarettes and has especial value for this mode of use in that it provides winding mechanism which will maintain an approximately constant tension on the filaments and also in that it provides for the contact winding of a large amount of yarn upon the bobbin in such a way that there is no tendency for the yarn to become loose at the edges of the bobbin, it is obviously also useful for winding yarns or threads of any kind.

Having now described my invention, what I claim as new and desire to secure by Letters Patent, is:

1. In a bobbin winding machine having means for rotating the bobbin and a reciprocating yarn carrier for guiding the yarn to the bobbin, means for reciprocating the yarn carrier through progressively shorter distances as the yarn is wound consisting of a drum cam of variable throw, a cam contacting slide connected to actuate the yarn carrier, means for rotating the cam and means for progressively shifting the cam with relation to the contacting slide to shorten the throw of the slide as the bobbin is wound.

2. In a machine having the features of claim 1, the combination therewith of means interposed between the cam contacting slide and the yarn carrier whereby a longer throw is given to the yarn carrier than that of the cam actuated slide.

3. In a machine having the features of claim 1, the combination therewith of means interposed between the cam contacting slide and the yarn carrier whereby the yarn carrier can be shifted to reciprocate through a different path.

4. In a machine having the features of claim 1, the use in said combination of bobbin rotating means imparting a constant peripheral speed to the winding surface so that the yarn passes to the bobbin at a uniform speed.

5. In a machine having the features of claim 1, the use in said combination of bobbin rotating means consisting of a pair of friction rollers upon which the bobbins rest and by which they are rotated at constant peripheral speed.

6. In a machine having the features of claim 1, the employment of means for rotating and shifting the drum cam consisting of a rotating shaft to which the cam is keyed with freedom to slide longitudinally, a parallel threaded shaft, means for rotating the threaded shaft in a fixed relation to the rotation of the cam supporting shaft, a cam supporting slide, a retractable trigger normally engaging the threaded shaft and moving with the slide and means for disengaging the trigger and shifting the slide and cam.

7. In a machine having the features of claim 1, the use of a variable throw drum cam progressively conformed to lessen the linear speed of travel of the yarn carrier as the path of travel shortens and the angular speed of rotation of the bobbin diminishes.

8. In a machine having the features of claim 1, means for operatively connecting the cam contacting slide with the yarn carrier comprising a rack moving with the slide, a gear wheel engaging said rack, a shaft to which said gear wheel is secured, a gear wheel of larger diameter secured to said shaft, a rack engaged by said larger gear wheel and means connecting said rack to the yarn carrier.

9. In a machine having the features of claim 1, the employment of cam shifting means acting intermittently at the end of each revolution of the cam.

10. In a machine having the features of claim 1, the employment of means for rotating and shifting the drum cam consisting of a rotating shaft to which the cam is keyed with freedom to slide longitudinally, a parallel threaded shaft, means for rotating the threaded shaft in a fixed relation to the rotation of the cam supporting shaft, a cam supporting slide, a retractable trigger normally engaging the threaded shaft and moving with the slide, a trigger actuating lever pivoted on the slide, a spring acting on said lever to press the trigger into contact with the screw shaft, a rack connected to the lever, a gear segment engaged with the rack whereby the trigger can be withdrawn and the slide shifted and means for actuating said gear segment.

11. In combination with means for exuding filaments of artificial silk a bobbin to receive a yarn made up of a group of such filaments, means for imparting to the winding surface of said bobbin a constant peripheral speed, a yarn carrier for delivering the yarn to the bobbin, a cam contacting slide connected to reciprocate the yarn carrier, a drum cam of variable throw for actuating said slide through progressively shorter paths of travel, and means for progressively shifting the cam.

12. A machine having the features of claim 11, in which the drum cam is progressively conformed to decrease the linear speed of travel of the yarn carrier as its length of travel diminishes and as the winding surface of the bobbin increases in diameter.

13. A machine having the features of claim 11, in which the drum cam is progressively conformed to decrease the linear speed of travel of the yarn carrier as its length of travel diminishes and as the winding surface of the bobbin increases in diameter and conformed also to progressively increase the linear speed of travel of the yarn carrier at points on either side of its position when delivering yarn to the center of the bobbin.

GEORGE JUER.